United States Patent
Apostolakis et al.

(10) Patent No.: US 9,981,454 B2
(45) Date of Patent: May 29, 2018

(54) POLYOLEFIN PRE-STRETCHED PACKAGING FILM

(75) Inventors: Michalis Apostolakis, Crete (GR);
Konstantinos G. Gatos, Evia (GR);
Anthony G. Karandinos, Crete (GR)

(73) Assignee: MEGA PLAST Industrial—Exporting S.A., Heraklion, Crete (GR)

( * ) Notice: Subject to any disclaimer, the term of this patent is extended or adjusted under 35 U.S.C. 154(b) by 0 days. days.

(21) Appl. No.: 13/393,885

(22) PCT Filed: Sep. 3, 2010

(86) PCT No.: PCT/EP2010/062990
§ 371 (c)(1),
(2), (4) Date: Apr. 30, 2012

(87) PCT Pub. No.: WO2011/026955
PCT Pub. Date: Mar. 10, 2011

(65) Prior Publication Data
US 2012/0270003 A1 Oct. 25, 2012

(30) Foreign Application Priority Data
Sep. 4, 2009 (GB) .................. 0915420.4

(51) Int. Cl.
B29D 22/00 (2006.01)
B32B 27/32 (2006.01)
(Continued)

(52) U.S. Cl.
CPC .............. B32B 27/32 (2013.01); B32B 3/266 (2013.01); B32B 27/08 (2013.01);
(Continued)

(58) Field of Classification Search
CPC ......... B32B 27/32; B32B 3/266; B32B 27/08; B32B 2553/00; B32B 2307/514;
(Continued)

(56) References Cited

U.S. PATENT DOCUMENTS 4,235,062 A 11/1980 Lancaster et al.
4,452,666 A 6/1984 Isidore
(Continued)

FOREIGN PATENT DOCUMENTS

DE 29519905 4/1997
DE 10201480 7/2003
(Continued)

OTHER PUBLICATIONS

Machine Translation of WO 03/059750 (Jul. 2003).*
(Continued)

*Primary Examiner* — James C Yager
(74) *Attorney, Agent, or Firm* — Christopher M. Scherer; DeWitt Ross & Stevens S.C.

(57) ABSTRACT

The invention provides a polyolefin pre-stretched packaging film comprising perforations arranged in a series of columns along a longitudinal direction of the film, wherein each adjacent column of said perforations is separated by a column without perforations along the longitudinal direction, and the perforations are staggered in a transverse direction across the film, wherein said film comprises an inherent cling surface on at least one of its surfaces; wherein the perforations cover at least 25% of the total surface area of the film, and the film has an inside/inside cling property of 5 to 22 gr, and a weight of no more than 13 g/m2.

18 Claims, 3 Drawing Sheets

(51) Int. Cl.
*B32B 3/26* (2006.01)
*B32B 27/08* (2006.01)

(52) U.S. Cl.
CPC ....... *B32B 2250/24* (2013.01); *B32B 2270/00* (2013.01); *B32B 2307/50* (2013.01); *B32B 2307/514* (2013.01); *B32B 2307/5825* (2013.01); *B32B 2307/718* (2013.01); *B32B 2307/72* (2013.01); *B32B 2553/00* (2013.01); *Y10T 83/0424* (2015.04); *Y10T 428/15* (2015.01)

(58) Field of Classification Search
CPC ............ B32B 2307/50; B32B 2307/72; B32B 2250/24; B32B 2270/00; B32B 2307/718; B32B 2307/5825; Y10T 428/15; Y10T 83/0424
USPC .................................... 428/35.7, 43
See application file for complete search history.

(56) References Cited

U.S. PATENT DOCUMENTS

| | | |
|---|---|---|
| 4,488,918 A | 12/1984 | Jofs |
| 4,754,594 A | 7/1988 | Lancaster |
| 5,935,681 A | 8/1999 | Paulett |
| 6,969,548 B1 | 11/2005 | Goldfine |
| 2001/0016245 A1 | 8/2001 | Tuman et al. |
| 2004/0178544 A1 | 9/2004 | Byron et al. |
| 2005/0118391 A1 | 6/2005 | Kavvadias et al. |
| 2005/0123721 A1 | 6/2005 | Heikaus et al. |
| 2006/0049190 A1 | 3/2006 | Middleton et al. |
| 2006/0194495 A1 | 8/2006 | Lubker, II |
| 2008/0280098 A1 | 11/2008 | Papadopoulos et al. |
| 2008/0311365 A1 | 12/2008 | Tukachinsky |
| 2009/0047468 A1 | 2/2009 | Papadopoulos et al. |
| 2009/0047855 A1 | 2/2009 | Seth et al. |

FOREIGN PATENT DOCUMENTS

| | | |
|---|---|---|
| EP | 0145499 | 6/1985 |
| EP | 0337719 | 10/1989 |
| EP | 0300855 | 12/1991 |
| EP | 0816056 | 1/1998 |
| EP | 0820856 | 1/1998 |
| EP | 0909721 | 4/1999 |
| EP | 0999037 | 5/2000 |
| EP | 1568485 | 8/2005 |
| EP | 1967357 | 9/2008 |
| GB | 2316341 | 2/1998 |
| WO | 9816177 | 4/1998 |
| WO | 0112000 | 2/2001 |
| WO | 200160709 | 8/2001 |
| WO | 02055311 | 7/2002 |
| WO | 2002094674 | 11/2002 |
| WO | 03059750 | 7/2003 |
| WO | 2004022634 | 3/2004 |
| WO | 2004033310 | 4/2004 |
| WO | 2004078869 | 9/2004 |
| WO | 2004080695 | 9/2004 |
| WO | 2005087608 | 9/2005 |
| WO | 2006018028 | 2/2006 |

OTHER PUBLICATIONS

International Search Report for PCT/EP2010/062990 dated Jan. 17, 2011.
International Search Report and Written Opinion for PCT/EP2010/062989 dated Mar. 8, 2011.

* cited by examiner

POLYOLEFIN PRE-STRETCHED PACKAGING FILM

CROSS REFERENCE TO RELATED APPLICATION

The present application is the U.S. national stage application of International Application PCT/EP2010/062990, filed Sep. 3, 2010, which international application was published on Mar. 10, 2011, as International Publication WO2011/026955. The International Application claims priority of British Patent Application 0915420.4, filed Sep. 4, 2009, the contents of which are incorporated herein by reference in their entireties.

FIELD OF THE INVENTION

This invention relates to a perforated pre-stretched polyolefin stretch film having cling characteristics suitable for wrapping goods.

BACKGROUND

Cling stretch film for pallet wrapping has been extensively proposed in the prior art. The prior art has been concerned with the mechanical performance and cling characteristics of such films.

For example, U.S. Pat. No. 5,093,188 discloses a single-sided cling stretch film of A/B/C structure where layer A exhibits a high cling force to the surface of the layer B which has a high tensile strength, wherein the C layer is cling-free. Such cling stretch films do not allow aeration of the pallet.

In cases where aeration is required, U.S. Pat. No. 5,935,681 has provided an air-permeable stretch film comprising two layers of polymeric film which clingingly adhere to one another and contain reinforcing perforations therethrough. In this patent, the proposed laminate structure increases the weight of the product considerably.

EP 1 255 681B1 discloses a reinforced perforated pre-stretched stretch film, wherein the high-stiffness final product has a high cost of production and increased weight due to the reinforcement.

For low weight wrapping film capable of ventilation, EP 0 820 856 B1 discloses a perforated pre-stretched stretch film, wherein the holes cover 30 to 70% of the area of the elongated film, wherein the elongation at break values are in the range of 200 to 500%. Furthermore, this film has a cling value of 3.9 gr, which is rather low.

SUMMARY OF THE INVENTION

The object of the present invention is to overcome problems currently existing in prior art packaging and to improve parameters such as cling, hole-area coverage, stiffness, weight and cost of packaging films.

The present invention relates to a low weight and low cost perforated pre-stretched stretch film having desirable stiffness characteristics. There is provided in a first aspect of the invention a polyolefin pre-stretched packaging film comprising perforations arranged in a series of columns along a longitudinal direction of the film, wherein each adjacent column of said perforations is separated by a column without perforations along the longitudinal direction, and the perforations are staggered in a transverse direction across the film,
wherein said film comprises an inherent cling surface on at least one of its surfaces and the perforations cover at least 25% of the total surface area of the film, and the film has an inside/inside cling property of 5-22 gr, as measured by the cling method.

In a second aspect of the invention there is provided use of the polyolefin pre-stretched packaging film according to the first aspect of the invention, to wrap goods in separate packets or to unitize goods on a pallet.

In a third aspect of the invention there is provided a method of producing a polyolefin pre-stretched packaging film comprising the steps of: i) stretching a polyolefin film; and ii) perforating the polyolefin film; wherein the perforations are arranged in a series of columns along a longitudinal direction of the film, wherein each adjacent column of said perforations is separated by a column without perforations along the longitudinal direction, and the perforations are staggered in a transverse direction across the film, wherein said film comprises an inherent cling surface on at least one of its surfaces; wherein the perforations cover at least 25% of the total surface area of the film, and the film has an inside/inside cling property of 5 to 22 gr, and a weight of no more than 13 g/m$^2$.

In particular the present invention is directed to a pre-stretched film of low weight, low cost and desirable stiffness characteristics, comprising polyolefins, wherein said film has a combination of a cling surface and a targeted surface area of perforations. As a result of this combination, ergonomic finding of the beginning of said film, and controllable tearing along the transverse direction of the film are achieved. The film of the present invention is particularly useful in wrapping applications, wherein aeration of goods is required.

Figure 2A:
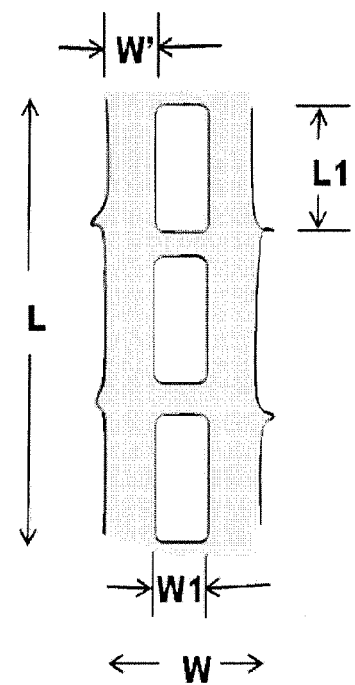
FIG. 2a indicates the length and width dimensions of a Centre Hole (CH) specimen.
Figure 2B:
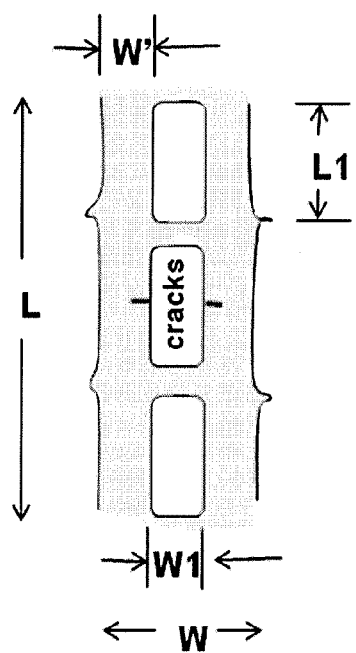
FIG. 2b indicates the length and width dimensions for Double Centre Hole Notched-Tensile (DCHN-T) specimen.

Further advantageously, the present invention avoids the need to use knots to apply the film onto a pallet. At the end of the wrapping process of the pallet load, it is normally necessary to create a "knot" by tying up the edge of the film on the outer film layers applied on the load. Thus the film edge is properly fixed avoiding film tailing effects. Such a 'knot' is necessary when the applied packaging material lacks suitable cling properties (for instance, netting or stretch film without any cling layer).

wherein in FIGS. 2a and 2b

W=width of a CH specimen (or a DCHN-T specimen);
L=length of a CH specimen (or a DCHN-T specimen);
W'=width of a column without holes;
W1=width of a column with holes; and
L1=length of a hole (or a DCHN-T specimen).

DETAILED DESCRIPTION OF THE INVENTION

In this patent specification the "longitudinal" direction of the film refers to the direction of the film in which it unwinds from the roller (the Machine Direction, MD) and is defined by columns of perforations separated by columns without perforations. The transverse direction of the film is perpendicular to this. Adjacent perforations in the transverse direction are staggered or offset with respect to one another. In a preferred embodiment, every other column of perforations is aligned.

The term "pre-stretched" means that stretching of the film occurs during the production of the polyolefin pre-stretched packaging film. The pre-stretching may be carried out before or after perforation of the film. Preferably stretching takes place after perforation in order to control the hole-opening propagation. In another embodiment the stretching can occur both before and after perforation. In another embodiment, the stretching and/or perforation step can be repeated. In one embodiment, a low level of stretching, such as 2-80% can be applied prior to perforation and further stretching of 20-250% can be applied after perforation.

The film of the present invention comprises perforations having a specific configuration, which facilitates the location of the beginning of the film.

The perforations in the film may be any shape. Preferably, the perforations are approximately circular or rectangular in shape. Typically the diameter is at least 5 mm. Where the perforations are approximately rectangular in shape, one or more of the edges of the perforations may be rounded. The radius of the rounded edges, the length and the width of the perforations (hereinafter interchangeably referred to as openings or holes), as well as, their distance along the MD may vary. In one embodiment of the invention, the radius of the rounded edges is in the range 2-5 mm, for instance around 3 mm. The length of the holes is typically in the range 12-24 mm, for instance 14-20 mm (and is normally around 18 mm). The width of the holes is generally around 4-12 mm, for instance 6-10 mm and in one particular embodiment is approximately 8.6 mm. The width of a column without holes is generally in the range 5-15 mm, for instance 7-12 mm and in one particular embodiment is approximately 9.8 mm.

In contrast to the film described in EP0820856, the perforations generally do not contact each other, i.e. there is an area of film at least 1.5 mm, 2 mm, 2.5 mm or 3 mm long between each perforation in the longitudinal direction of the film.

The film of the current invention is particular useful for wrapping goods which require aeration. In order to apply the said film around a pallet of such goods without the need for end of film knots, a suitable interplay of hole-area coverage along with cling property is important. The perforations of said perforated pre-stretched packaging stretch film cover at least 25% and preferably 25-50% of the total area of said film. In certain embodiments the perforations cover 30-45% of the total area of said film, preferably 35-40% of the total area of said film.

Such perforations exhibit a film having adequate aeration of the wrapped products, facilitating environmental equilibria inside and outside of the pallet. At the same time, a hand-induced tearing along the transverse direction can be controllably initiated and propagated, thus resulting in an ergonomic handling of the film.

The optimized interplay of hole-configuration, thickness and chemical formulation of the film of the current invention renders a film that is more amenable to use with forklifts.

In the present invention, the term "fluffy" is used to refer to the film winding. A "fluffy" wound film means that the film winding on the core is soft and even, i.e. not tight with an uneven surface, which leads to knob creation on the roll edges. A "fluffy" wound film facilitates the ergonomic film usage in terms of easy finding of the film edge. Furthermore, film damage is minimized in the event that the roll is inadvertently dropped (the "fluffy" and even film winding allows better percussion energy absorption).

In order to obtain a "fluffy" winding of the roll, winding module settings (applied pressure etc.) often need to be adjusted. In addition, the film's physical characteristics have a major impact on the obtaining of even roll winding. The uniformity of the film thickness towards to the transversal direction has a major impact. Substantial film thickness deviations (approximately 2-5 µm) are observed on pre-stretched stretch films (due to the imposed stretching and the "neck down" effect). The aforementioned deviation is even more marked on stretch film of blown technology. In addition, prestretched stretch films with reinforcement elements show the same deviation. The film of the present invention exhibits a substantially uniform thickness along the transversal direction.

Typically, the residues (due to the unwrapping process) of packaging products like netting & net-like perforated pre-stretched stretch films can become easily wrapped around forklift wheels, destroying bearings resulting in conversely, high machinery (forklifts) maintenance costs.

After the unwrapping process, a low volume, "solid" ball of the used film of the current invention can be created, due to its properties: low weight, proper pattern & inside cling, which do not have these deleterious effects on forklifts.

The film is particularly useful in wrapping goods, in particular to unitize flowers and plants in suitable trolleys.

It is an object of the present invention to provide a low weight and low cost perforated pre-stretched stretch film. Such stretch film yields desirable mechanical properties, permitting the initiation and the controllable propagation of a hand-induced tearing of the film in the transverse direction. At the same time, said film possesses an adequate inherent cling property, at least on one of the surfaces thereof, along with a desirable perforation-area coverage.

The perforations of said perforated pre-stretched stretch film are arranged staggered in a series of columns along the longitudinal direction. Between two adjacent columns of said perforations a column without perforations along the longitudinal direction is located. The width along the transverse direction of the film of the present invention is the summation of the width along the transverse direction of said columns with holes and columns without holes. The length along the longitudinal direction of the film of the present invention is the length along the longitudinal direction of the columns with holes or columns without holes. The width and number of said columns without holes, as well as, of said columns with holes may vary at will. The film at the lateral columns without holes may have a width of more than one times the width of an adjacent column without holes. In preferred embodiments the film edge at the lateral columns without holes is hemmed. The properties and the overall behaviour of the film of the present invention rely on the respective properties and behaviour of said columns with holes and said columns without holes.

The film of the present invention preferably has a necked-in width of 35-54 cm, preferably 44-52 cm and is most preferably around 50 cm. The film width decreases due to film stretching, and this is known as "neck in" or neck down" effect. In the present invention, the term "necked-in" means that the "final" film width has been obtained. Since the film of the present invention, is a pre-stretched stretch film, its width is decreased and thus the film is "necked" in. The final (after the production process) film's width is the "necked-in" width of the film.

The inside surface of a stretch film usually possesses the cling property. Therefore, the inside/inside cling property supplies a measure of the clinginess of the stretch film. As the area covered by perforations increases, the overall clinginess of the inside surface decreases. The film of the current invention has a particular interplay of hole-area coverage and cling property which is innovative for industrial applications. The film of the present invention has an inside/inside cling property in the range 5-22 gr as measured by Cling Method. In certain embodiments the inside/inside cling property is 6-19 gr or more preferably 7-17 gr.

In this invention, the relatively large area covered by perforations (or "holes"), combined with the high elongation at break values (see below), inhibit the manual tearing of the film in the transverse direction during application. It is preferable said hand-induced tearing to be initiated along the transverse direction at any part of the film of the present invention among the lateral columns without holes, more preferably close to middle of the width of the film of the present invention. Said hand-induced controllable tearing along the transverse direction propagates preferably towards both lateral edges of the film of the present invention. In certain embodiments said hand-induced tearing is initiated at a lateral column without holes of the film of the present invention, wherein said tearing propagates along the transverse direction, towards the opposite lateral column without holes of said film. The hand-induced controllable tearing along the transverse direction is feasible due to the innovative combination of properties (e.g. force along the MD required for tear propagation along the TD, elongation at break, force along the MD required to break columns without holes, etc.) of the film of the present invention.

The stiffness characteristics of the film and properties of the film of the present invention allow the film to adequately unitize packed goods by using manual or machine means. The film can break smoothly by applying a hand-induced force. Normally the film is forced to tear using mechanical means to ensure automatic and continuous production operation.

The film of the current invention comprises polyolefins. At least one of the surfaces of the said film presents inherent cling behaviour (i.e. there is a substantial absence of tackifiers). This allows there to be no requirement for knots when applying the film onto a pallet.

Preferably, the polyolefins used in the films of the present invention are selected from polymers and copolymers comprised primarily of olefins. For example, the polyolefin may be selected from the group consisting of polyethylene, polypropylene, polybut-1-ene and poly-4-methylpent-1-ene. Further examples include polymers of cycloolefins, for example of cyclopentene or norbornene.

Particularly preferred films include polyethylene medium density polyethylene (MDPE), low density polyethylene (LDPE), linear low density polyethylene (LLDPE), branched low density polyethylene (BLDPE), very low density polyethylene (VLDPE) and ultra low density polyethylene (ULDPE).

The films of the present invention may also comprise mixtures of the polyolefins mentioned in the preceding paragraphs, for example, polypropylene with polyethylene (for example PP/HDPE, PP/LDPE) and mixtures of different types of polyethylene (for example LDPE/HDPE).

Particularly preferred polyolefins for use in the present invention are LLDPE C4, LLDPE C6, LLDPE C8, metallocene LLDPE C6 or LLDPE C8 and high pressure LDPE.

Furthermore, the films of the present invention may comprise copolymers of monoolefins with each other or with other vinyl monomers, for example ethylene/propylene copolymers, linear low density polyethylene (LLDPE) and mixtures thereof with low density polyethylene (LDPE) and propylene/but-1-ene copolymers.

The film of the present invention can be produced by cast or blown extrusion and co-extrusion methods. Generally the film is comprised of at least three layers. In preferred embodiments of the invention the film is an asymmetrical A/B/C film, wherein A stands for the slip layer, B for the core layer and C for the cling layer. In specific embodiments layer B comprises a plethora of symmetrical or asymmetrical layers. Each of the layers comprises a single polyolefin polymer or a mixture of polyolefins. The cling layer comprises from about 5% to about 30%, preferably about 5% to about 20% of the thickness of the film. The cling layer preferably contains from about 40% to 100% by weight of a very low density polyethylene (VLDPE). The VLDPE may have a density ranging from 0.870 gr/cm$^3$ to 0.905 gr/cm$^3$, such as 0.875 gr/cm$^3$ to 0.905 gr/cm$^3$ and a melt flow index ranging from 0.5 gr/10 min to 5.0 gr/10 min. In certain embodiments the cling layer may also comprise an ultra low density polyethylene (ULDPE) in a range from 0% to 60% by weight of the cling layer. The ULDPE typically has a density ranging from 0.865 gr/cm$^3$ to 0.900 gr/cm$^3$, such as from 0.870 gr/cm$^3$ to 0.890 gr/cm$^3$ and a melt flow index ranging from 0.5 gr/10 min to 10.0 gr/10 min, such as 0.5 gr/10 min to 5.0 gr/10 min.

Preferably, the reinforced thermoplastic film of the present invention comprises a base film which is an extruded multilayered stretchable or pre-stretched film. The base film may have 3+2 m layers, where m is a natural number such as 0, 1, 2, 3, 4 . . . . Preferably, the base film has 3, 5, 7, 9, 12, 15, 17, 19, 21, 23, 25 or 27 layers, more preferably 3, 5 or 7 layers, more preferably 3 or 5 layers, most preferably 5 layers.

Preferably, the base film has a symmetrical (ABA for a three layer film; ABCBA for a five layer film) structure, wherein each of A, B and C represent a different type of layer in the multi-layer film. Preferably the stack of the multilayer is symmetric with regards to the central layer.

A further preferred base film is one having a five layer asymmetric structure (for example ABODE), wherein each of A, B, C, D and E represent a different type of layer in the film. In the ABODE structure, layers B and D may be made of the same composition and/or be of the same thickness.

A further preferred base film is one having a three layer asymmetric structure (for example ABC), wherein each of A, B and C represent a different type of layer in the film.

For the above ABA layer structure, the layer A is preferably present in the range of 5-30% of the base film thickness, preferably 5-20%, preferably 10-15% thereof. The layer B is preferably present in the range of 40-90% of the base total film thickness, preferably 60-90%, preferably 70-80% thereof.

For the above ABC layer structure, the layer A is preferably present in the range of 5-30% of the base film thickness, preferably 5-20%, preferably 10-15% thereof. The layer B is preferably present in the range of 40-90% of the base total film thickness, preferably 60-90%, preferably 70-80% thereof. The layer C is preferably present in the range of 5-30% of the base total film thickness, preferably 5-20%, preferably 10-15% thereof.

For the above ABC layer structure, the layer A is preferably a slip layer, the layer B is preferably a core layer and the layer C is preferably a cling layer.

For the above ABA layer structure, preferably the density of layer B>layer A.

For the above ABC layer structure, preferably the density of layer A>layer C.

For the above ABC layer structure, preferably the major melting peak of layer A>layer C. For the above ABC layer structure, preferably the density of layer A≥layer B>layer C. For the above ABC layer structure, preferably the major melting peak of layer A layer B>layer C.

The major melting peak refers to the major peak of the melting curve in a heat-flow versus temperature graph of said polymer obtained by means of Differential Scanning calorimetry (DSC). The major melting peak was calculated using a Mettler Toledo DSC822$^e$ model at a heating rate of 10° C./min under nitrogen atmosphere. Sample of 10-15 mg of said polymer was heated up to 190° C. followed by its cooling at around −70° C. with a cooling rate of 10° C./min under nitrogen atmosphere. During the second heat up to the melt, the major melting peak was identified and its position upon the temperature scale was reported.

For the above ABC layer structure, preferably the density of layer A is greater than 0.916 g/cm$^3$, the density of layer B is preferably in the range of 0.916-0.938 g/cm$^3$, and the density of layer C is preferably in the range of 0.870 g/cm$^3$ to 0.905 g/cm$^3$.

For the above ABC layer structure, preferably layer A comprises greater than 50% by weight of LLDPE (Linear Low Density Polyethylene), preferably greater than 75%, preferably greater than 90%, preferably substantially 100% LLDPE. Preferably, the LLDPE of layer A, and where other materials to LLDPE are present, layer A itself, has a density of greater than 0.916 g/cm$^3$, preferably 0.916-0.938 g/cm$^3$, preferably about 0.923 g/cm$^3$. Preferably, the LLDPE of layer A, and where other materials to LLDPE are present, layer A itself has a major melting peak in the range of 95° C.-145° C., preferably 105° C.-130° C., more preferably about 120° C.

For the above ABC layer structure, preferably layer B comprises greater than 50% by weight of LLDPE (Linear Low Density Polyethylene), preferably greater than 75%, preferably greater than 90%, preferably substantially 100% LLDPE. Preferably, the LLDPE of layer B, and where other materials to LLDPE are present, layer B itself has a density in the range of 0.916-0.938 g/cm$^3$, preferably 0.918-0.922 g/cm$^3$, preferably about 0.920 g/cm$^3$. Preferably, the LLDPE of major melting peak in the range of 90° C.-130° C., preferably 95° C.-125° C., more preferably about 117° C.

For the above ABC layer structure, preferably layer C comprises greater than 20% by weight of VLDPE or ULDPE (Very Low Density Polyethylene or Ultra Low Density Polyethylene), or a mixture thereof, preferably greater than 50%, preferably greater than 75%, preferably substantially 100% VLDPE or ULDPE. Most preferably, layer C comprises ULDPE. Preferably, the ULDPE of layer C, and where other materials to ULDPE are present, layer C itself has a density in the range of 0.870 g/cm$^3$ to 0.890 g/cm$^3$, preferably 0.875-0.885 g/cm$^3$, preferably about 0.880 g/cm$^3$. Preferably, the VLDPE of layer C, and where other materials to VLDPE are present, layer C itself has a density in the range of 0.870 g/cm$^3$ to 0.905 g/cm$^3$, preferably 0.900-0.902 g/cm$^3$, preferably about 0.902 g/cm$^3$. Preferably, the VLDPE of layer C, and where other materials to VLDPE are present, layer C itself has a major melting peak in the range of 70° C.-130° C., preferably 80° C.-125° C., more preferably about 100° C. Preferably, the ULDPE of layer C, and where other materials to ULDPE are present, layer C itself has a melting point in the range of 50° C.-110° C., preferably 60° C.-100° C., more preferably about 70° C. The cling properties can be increased by increasing the percentage of ULDPE in the cling layer.

For the above ABCDE layer structure or the ABCDA structure or the ABCBE structure or the ABCBA structure, the layer A is preferably present in the range of 2-30% of the base film thickness, preferably 5-15% thereof. The layer B is preferably present in the range of 5-40% of the base film thickness, preferably 10-30% thereof. The layer C is preferably present in the range of 20-80% of the base film thickness, preferably 30-60% thereof, more preferably 35-55% thereof. The layer D (where present) is preferably present in the range of 5-40% of the base film thickness, preferably 10-30% thereof. The layer E (where present) is preferably present in the range of 2-30% of the base film thickness, preferably 5-15% thereof.

For the above ABODE layer structure, the layer A is preferably a slip layer, the layer B is preferably an intermediate layer and the layer C is preferably a core layer, layer D is an intermediate layer and layer E is preferably a cling layer. Preferably, the ULDPE of layer E, and where other materials to ULDPE are present, layer E itself has a major melting peak in the range of 50° C.-110° C., preferably 60° C.-100° C., more preferably about 70° C. The cling properties can be increased by increasing the percentage of ULDPE in the cling layer.

For the above ABCDE layer structure, preferably the density of layer A>layer E. For the above ABCDE layer structure, preferably the major melting peak of layer A>layer E. For the above ABCDE layer structure, preferably the density of layer A≥layer C>layer E. For the above ABODE layer structure, preferably the major melting peak of layer A≥layer C>layer E.

For the above ABODE layer structure, layer A preferably has a density in the range of 0.916-0.938 g/cm$^3$, layer B preferably has a density of greater than 0.916 g/cm$^3$, layer C preferably has a density of greater than 0.916 g/cm$^3$, layer D preferably has a density of greater than 0.916 g/cm$^3$, layer E preferably has a density in the range of 0.870 g/cm$^3$ to 0.905 g/cm$^3$.

For the above ABODE layer structure, preferably layer A comprises greater than 50% by weight of LLDPE (Linear Low Density Polyethylene), preferably greater than 75%, preferably greater than 90%, preferably substantially 100% LLDPE. Preferably, the LLDPE of layer A, and where other materials to LLDPE are present, layer A itself has a density of greater than 0.916 g/cm$^3$, preferably 0.916-0.938 g/cm$^3$, preferably about 0.923 g/cm$^3$. Preferably, the LLDPE of layer A, and where other materials to LLDPE are present, layer A itself has a major melting peak in the range of 95° C.-145° C., preferably 105° C.-130° C., more preferably about 120° C.

For the above ABODE layer structure, preferably layer B may be any polyolefin, preferably a polyethylene, and preferably comprises greater than 50% by weight of LLDPE (Linear Low Density Polyethylene), preferably greater than 75%, preferably greater than 90%, preferably 100% LLDPE. In certain embodiments layer B is the same composition and/or thickness as layer D, as described herein.

For the above ABCDE layer structure, preferably layer C comprises greater than 50% by weight of LLDPE (Linear Low Density Polyethylene), preferably greater than 75%, preferably greater than 90%, preferably substantially 100% LLDPE. Preferably, the LLDPE of layer C, and where other materials to LLDPE are present, layer C itself has a density in the range of 0.916-0.938 g/cm$^3$, preferably 0.918-0.922 g/cm$^3$, preferably about 0.920 g/cm$^3$. Preferably, the LLDPE of layer C, and where other materials to LLDPE are present, layer C itself has a major melting peak in the range of 90° C.-130° C., preferably 95° C.-125° C., more preferably about 117° C.

For the above ABODE layer structure, preferably layer D may be any polyolefin, preferably a polyethylene, and preferably comprises greater than 50% by weight of LLDPE (Linear Low Density Polyethylene), preferably greater than 75%, preferably greater than 90%, preferably 100% LLDPE. In certain embodiments layer D is the same composition and/or thickness as layer B, as described herein.

For the above ABODE layer structure, preferably layer E comprises greater than 20% by weight of VLDPE or ULDPE (very Low Density Polyethylene or ultra Low Density Polyethylene), preferably greater than 50%, preferably greater than 75%, preferably substantially 100% VLDPE or ULDPE. Most preferably, layer E comprises substantially ULDPE. Preferably, the ULDPE of layer E, and where other materials to ULDPE are present, layer E itself has a density in the range of 0.870 g/cm$^3$ to 0.890 g/cm$^3$, preferably 0.875-0.885 g/cm$^3$, preferably about 0.880 g/cm$^3$. Preferably, the VLDPE of layer E, and where other materials to VLDPE are present, layer E itself has a density in the range of 0.890 g/cm$^3$ to 0.905 g/cm$^3$, preferably 0.900-0.902 g/cm$^3$, preferably about 0.902 g/cm$^3$. Preferably, the VLDPE of layer E, and where other materials to VLDPE are present, layer E itself has a major melting peak in the range of 70° C.-130° C., preferably 80° C.-125° C., more preferably about 100° C. Preferably, the ULDPE of layer E, and where other materials to ULDPE are present, layer E itself has a melting point in the range of 50° C.-110° C., preferably 60° C.-100° C., more preferably about 70° C. The cling properties can be increased by increasing the percentage of ULDPE in the cling layer.

For the above ABODE layer structure, B, C and D can comprise nanolayers. The technology of producing nanolayers is described in more detail in US2009/0104424.

For the above ABC layer structure, preferably layer A comprises more than one layer. Preferably layer A is comprised of 1 or 2 or 3 or up to n layers, wherein n belongs to natural numbers. Thus, layer A is comprised of the layers $A_1$, $A_2$, $A_3$, up to $A_n$, wherein n belongs to natural numbers. The layers $A_1$ up to $A_n$ are preferably produced by separate extruders, by the same extruder or by any combination thereof. Preferably layer $A_1$ is the outer layer of layer A, wherein the materials used in layer $A_1$ are these compounded in layer A of an ABC layer stack. Preferably the density of layer $A_1$ is that of said layer A of an ABC layer stack. Preferably the major melting peak of the materials compounded in layer $A_1$ is that of said layer A of an ABC layer stack.

For the above ABC layer structure, preferably layer B comprises more than one layer. Preferably layer B is comprised of 1 or 2 or 3 or up to k layers, wherein k belongs to natural numbers. Thus, layer B is comprised of the layers $B_1$, $B_2$, $B_3$, up to $B_k$, wherein k belongs to natural numbers. The layers $B_1$ up to $B_k$ are preferably produced by separate extruders, by the same extruder or by any combination thereof.

For the above ABC layer structure, preferably layer C comprises more than one layer. Preferably layer C is comprised of 1 or 2 or 3 or up to n layers, wherein n belongs to natural numbers. Thus, layer C is comprised of the layers $C_1$, $C_2$, $C_3$, up to $C_n$, wherein n belongs to natural numbers. The layers $C_1$ up to $C_n$ are preferably produced by separate extruders, by the same extruder or by any combination thereof. Preferably layer $C_1$ is the outer layer of layer C, wherein the materials used in layer $C_1$ are these compounded in layer C of an ABC layer stack. Preferably the density of layer $C_1$ is that of said layer C of an ABC layer stack. Preferably the major melting peak of the materials compounded in layer $C_1$ is that of said layer C of an ABC layer stack.

For the above $(A_1, A_2, A_3,$ up to $A_n)(B_1, B_2, B_3,$ up to $B_k)(C_n, C_{n-1}, C_{n-2},$ down to C-1) multi layer stack, preferably the materials used in any layer $A_2$ up to $A_n$ are these compounded in any layer of an ABC layer stack. Preferably the density of any layer $A_2$ up to $A_n$ is that of any layer of an ABC layer stack. Preferably the major melting peak of the materials compounded in any layer $A_2$ up to $A_n$ is that of any layer of an ABC layer stack.

For the above $(A_1, A_2, A_3,$ up to $A_n)(B_1, B_2, B_3,$ up to $B_k)(C_n, C_{n-1}, C_{n-2},$ down to $C_{-1})$ multi layer stack, preferably the materials used in any layer $B_1$ up to $B_k$ are these compounded in any layer of an ABC layer stack. Preferably the density of any layer $B_1$ up to $B_k$ is that of any layer of an ABC layer stack. Preferably the major melting peak of the materials compounded in any layer $B_1$ up to $B_k$ is that of any layer of an ABC layer stack.

For the above $(A_1, A_2, A_3,$ up to $A_n)(B_1, B_2, B_3,$ up to $B_k)(C_n, C_{n-1}, C_{n-2},$ down to $C_{-1})$ multi layer stack, preferably the materials used in any layer $C_n$ down to $C_2$ are these compounded in any layer of an ABC layer stack. Preferably the density of any layer $C_n$ down to $C_2$ is that of any layer of an ABC layer stack. Preferably the major melting peak of the materials compounded in any layer $C_n$ down to $C_2$ is that of any layer of an ABC layer stack.

The base film is substantially a thin film, the average thickness thereof being preferably less than 18 μm, preferably less than 14 μm, preferably less than 11 μm and more preferably less than 10 μm.

The film is then typically perforated and stretched so as to produce the pre-stretched stretch film of the present invention. In specific embodiments said film is stretched after the formation of the perforations so as to produce the pre-stretched stretch film of the present invention. In certain embodiments the perforations are formed by thermal irradiation method without contacting said film. In preferred embodiments said film is produced having a thickness of less than 23 μm wherein after the formation of perforations said film is stretched and elongated less than 350% at a temperature range between room temperature and 100° C., so as to produce the pre-stretched stretch film of the present invention.

In preferred embodiments the inherent cling property of the pre-stretched stretch film is provided by the VLDPE, ULDPE or combinations thereof. In certain embodiments the film of the present invention has a cling property close to around 5 gr, according to Cling Method, by initially adding to the cling layer a low percentage of VLDPE, in the absence of ULDPE. To provide a cling property closer to 22 gr, according to Cling Method, VLDPE is blended into the cling layer with an increased percentage of ULDPE.

The present invention provides a perforated pre-stretched stretch film wherein the weight of said film is generally less than 11 g/m$^2$. In a preferred embodiment the weight of said film is less than 10 g/m$^2$ or more preferably less than 9 g/m$^2$. The thickness of the film of the present invention is typically less than 18 μm, preferably less than 14 μm, preferably less than 13 μm. In a preferred embodiment the thickness of said film is less than 12 μm or 11 μm or more preferably less than 10 μm. As the packaging cost increases in proportion to the thickness, a low cost product with reduced waste volume is achieved, which is environmentally friendly.

Due to the manual and machine use of the present invention, said film should possess moderate mechanical properties. On the one hand said film should withstand adequate force and strain at break with parallel tearing resistance and on the other hand to yield low stiffness in order to be ergonomic and fluffy. The force required to break two adjacent columns without holes of the film of the present invention is more than 1 kg and less than 4 kg, preferably more than 2 kg and less than 4 kg, wherein the strain at break is more than 50% and less than 200%, preferably more than 50% and less than 190%, preferably more than 50% and less than 150% as measured by the Tensile Experiment. At the same time, a crack propagates along the transverse direction from both sides of a hole of said film by applying a force along the machine direction, less than 1500 gr as measured by the Tear Test. In certain embodiments said force is less than 1350 gr. The stiffness characteristics of said film are expressed by the force required to elongate up to 10% strain two adjacent columns without holes of said film according to the Tensile Experiment. The use of force for estimating stiffness takes place instead of stress, as the measure of the latter comprises a matter of controversy for perforated films. Recording stress (or force) at a specific strain to evaluate stiffness (i.e. modulus) is a method well-known in rubber technology. The above-mentioned force at 10% strain for the film of the present invention is more than 0.10 kg and less than 1.10 kg as measured by the Tensile Experiment. In certain embodiments said force is more than 0.25 kg and less than 0.75 kg.

Unlike some films of the prior art, the film of the present invention preferably does not comprise reinforcing elements such as strips.

Figure 1A:
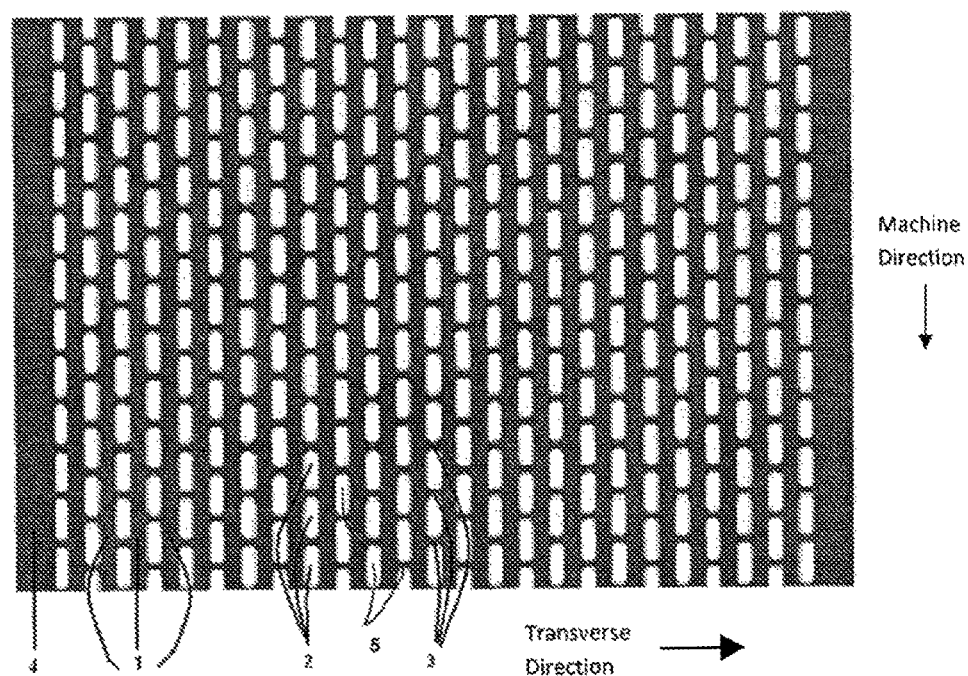
FIG. 1a is a top view of a portion of the perforated pre-stretched stretch film of the invention.
Figure 1B:
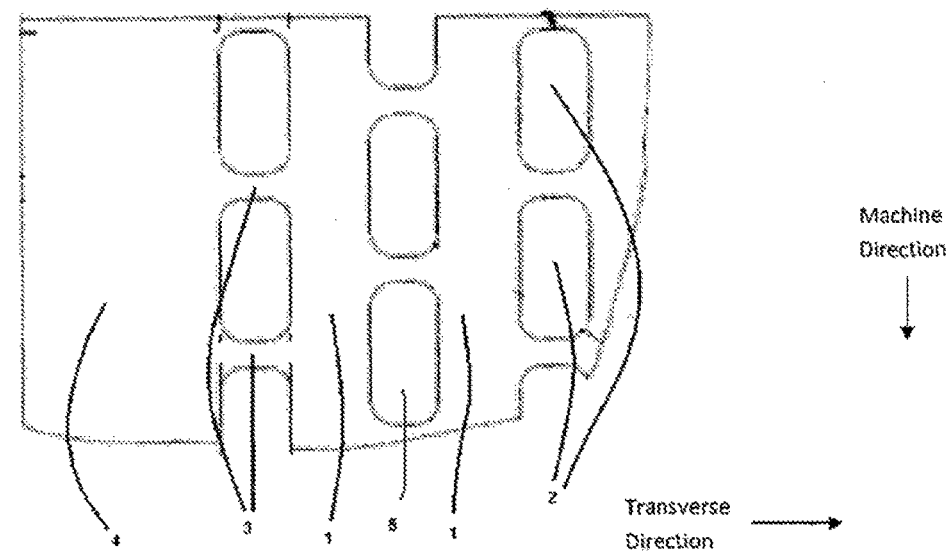
FIG. 1b is a top view of a lateral edge portion of the perforated pre-stretched stretch film of the invention.

Referring now to the figures, in FIG. 1a, a top view of a portion of the perforated pre-stretched stretch film of the present invention is depicted. The perforations (2) of said film are arranged staggered in series of columns (5) along the longitudinal direction and two adjacent columns of said perforations are situated in-between one series of columns without perforations (1) along the longitudinal direction. Adjacent perforations along the machine direction are separated by a film portion (3). The lateral edge (4) is shown. For certain embodiments the width and number of said columns without holes, as well as, of said columns with holes may vary at will. A top view of a lateral edge portion of the film of the current invention is shown in FIG. 1b which has the same reference numbering as FIG. 1a. Thereon, the opening configuration of said perforations appears. The design of said film is such that permits an ergonomical finding of the beginning of said film. Moreover, the openings are located to allow a hand-induced controllable tearing along the transverse direction of the film. In the above-mentioned embodiment the opening is of rectangular configuration with rounded edges. For certain embodiments the radius of the rounded edges, the length and the width of the openings, as well as, their distance along the MD may vary at will. In other embodiments of the current invention, the film at the lateral columns with holes may have a width of more than one times the width of an adjacent column without holes.

Equipment & Methods

For the evaluation of the weight of the perforated film, a half meter length of the said film, which corresponds to a specific surface, is weighed. The weight of the perforated film is expressed in grams per square meter ($g/m^2$). The ambient temperature when carrying out the experiments was 23° C. and the humidity was 50%.

The method developed and used for determining the cling property for perforated films is as follows:

A. Equipment

An Instron (Model 3365) universal testing machine with a constant rate of grip separation equipped with a load cell of 100N was used.

B. Test Specimens

The roll to be tested must have at least three outer wraps removed just prior to sample selection. Without touching the film test surface, the film was placed on a glass cutting surface being cautious not to create wrinkles. The holes on the examined perforated films lay staggered in columns along the machine direction (MD), wherein columns without holes lay between the said columns of holes.

Using a razor blade or sharp scissors, specimen having a width of two adjacent columns without holes and one column of holes in-between, along the transverse direction (TD), is cut. This type of sample according to Megaplast's designation is called thereon as Centre Hole specimen (CH). In cases that the lateral column without holes at the edge of the film along the TD has a width of more than three times the width of the narrower column without holes, then a specimen having a width of two times the width of the narrower column without holes is additionally cut and follows accordingly the below-mentioned procedure.

The length of the specimens along the (MD), for evaluating the cling property, is approximately 220 mm. Each specimen has a width along the TD, which corresponds to a specific fraction of each initial film/roll width. The specimen prior to testing was prepared by folding along the MD on itself. Using the wide side of a paint brush and moderate pressure and speed, a length of 80 mm folded specimen with five strokes was brushed. The overlapping created a contact of the same side of the film, which was chosen to be the inside/cling layer of the film. Therefore, the current method measures the so-called 'same side cling'.

C. Test Operation

Figure 3:
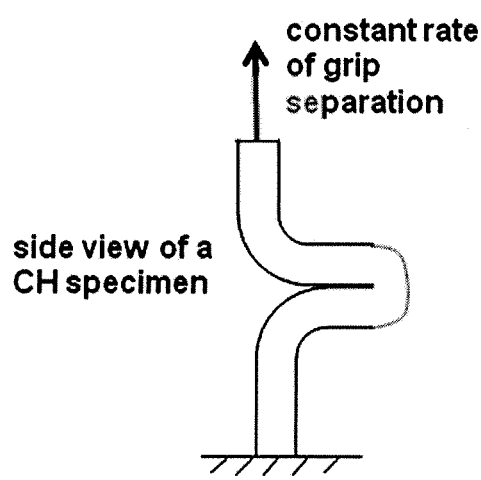
FIG. 3 shows a T-type CH specimen from the side during the cling method.

The free sides of the folded specimen along the TD were clamped on the testing machine creating a T-type sample configuration. The grip distance was 50 mm and the specimen was pulled apart with a cross-head speed of 150 mm/min. During the test, the plane of the overlapped surfaces remained fixed vertical to the load direction. When the overlapped surfaces were unfolded, the test was terminated. FIG. 3 illustrates the side view of a T-type specimen configuration during testing (constant rate of grip separation). Note that the overlapped region in this figure brings into contact the same side of the film.

D. Calculations

The force required to unfold the same side of the overlapped perforated specimen is a measure of the same side cling. Monitoring the necessary force to peel-off the overlapped perforated specimen versus the extension, an S-type curve and thus, a force-plateau is obtained. The force average at the plateau between 20 and 100 mm of the extension provides the same side cling per measured specimen. The cumulative same side cling of a perforated film, with fixed width of columns with and without holes, is given by the ratio of the measured/plateau force to unfold the perforated specimen over the film width fraction that corresponds to said perforated CH specimen. In cases that the width of columns with holes and the width of columns without holes vary along the transverse direction, the cumulative same side cling is the summation of the cumulative same side clings from each region with repeated structure. The same holds for the lateral columns without holes at the edge of the film along the TD in case that they have been initially considered. The cumulative same side cling of each perforated film is reported in units of force, preferably grams force.

The evaluation of the hole-area coverage for perforated films is given by the ratio of the hole-area appearing in half meter perforated film over the area of the whole of said perforated film for the same unit length. The hole-area coverage is expressed in percentage (%).

The test developed and used for estimating the force required to tear the said perforated films is as follows:

A. Equipment

An Instron (Model 3365) universal testing machine with a constant rate of grip separation equipped with a load cell of 1000N was used.

B. Test Specimens

The roll to be tested must have at least three outer wraps removed just prior to sample selection. Without touching the film test surface, the film was placed on a glass cutting surface being cautious not to create wrinkles. The holes on the examined perforated films lay staggered in columns along the machine direction (MD), wherein columns without holes lay between the said columns of holes. Using a razor blade or sharp scissors, Centre Hole specimens were cut.

The length of the CH specimens along the MD, for evaluating tearing, is set five times the width of a CH specimen increased by the length of a hole along the MD (note that this length is adequate to consider a uniform distribution of forces at the middle of a non-perforated specimen of the same sample's width). At the equator of a central hole of the CH specimen, two cracks are manually generated, using a razor blade or sharp scissors, each having a crack length of 10% of the said column without holes of the said CH specimen. This type of sample according to Megaplast's designation is called thereon as Double Centre-Hole Notched-Tensile specimen (DCHN-T).

C. Test Operation

The free sides of the DCHN-T specimen along the TD were clamped on the testing machine supplying a Mode-I crack opening configuration. The grip distance was three times the width of the DCHN-T specimen increased by the length of a hole along the MD and the specimen was pulled apart with a cross-head speed of 1000 mm/min. When the DCHN-T specimen is torn, the test is completed.

D. Calculations

The force required to tear a DCHN-T specimen is a measure of the ability of the said perforated film, wherein the DCHN-T specimen comprises a fraction, to withstand tearing. Monitoring the needed force to tear a DCHN-T versus the extension, a force-plateau is usually obtained. The maximum force average at the plateau provides the force required to tear a DCHN-T specimen and it is reported in units of force, preferably grams force.

The experiment developed and used for estimating the force required to break a perforated film is as follows:

A. Equipment

An Instron (Model 3365) universal testing machine with a constant rate of grip separation equipped with a load cell of 1000N was used.

B. Test Specimens

The roll to be tested must have at least three outer wraps removed just prior to sample selection. Without touching the film test surface, the film was placed on a glass cutting surface being cautious not to create wrinkles. The holes on the examined perforated films lay staggered in columns along the machine direction (MD), wherein columns without holes lay between the said columns of holes. Using a razor blade or sharp scissors, Centre Hole specimens were cut.

The length of the CH specimens along the MD, for evaluating tensile properties, is set to six times the width of a CH specimen.

C. Test Operation

The free sides of the CH specimen along the TD were clamped on the testing machine. The grip distance was four times the width of the CH specimen and the specimen was pulled apart with a cross-head speed of 500 mm/min. When the CH specimen fractured, the test is completed.

D. Calculations

The force required to break a CH specimen is a measure of the mechanical performance of the said perforated film, wherein the CH specimen is a specific fraction. By monitoring the needed force to elongate till breakage a CH specimen versus the strain level, a force-strain curve is obtained. The force at break and the strain at break provide the ultimate tensile properties of a CH specimen and they are reported preferably in units of kilograms force and percentage, respectively. The force at 10% strain is recorded and considered as a measure of stiffness for each CH specimen.

The following non-limiting examples demonstrate some unexpected results regarding the combination of hole-area coverage, clinginess, weight and mechanical properties obtained with the perforated cling pre-stretched stretch film of the present invention.

Example 1

Perforated pre-stretched stretch film is provided wherein the perforations cover 28.0% of the total area and the weight of said film is 7.1 g/m$^2$ having a thickness of 8 µm. The cumulative same side cling of this perforated film was tested according to Cling Method and it was found to be 14.6 gr. At the same time, a crack propagates from both sides of a hole along the TD requiring a force of 1350 gr, according to Tear Test. The ultimate tensile properties of a CH specimen for said sample are 2.5 kg at 60% strain, possessing at the same time a force at 10% strain of 0.68 kg, according to Tensile Experiment.

Example 2

Perforated pre-stretched stretch film is provided wherein the perforations cover 36.7% of the total area and the weight of said film is 8.6 g/m$^2$ having a thickness of 10 µm. The cumulative same side cling of this perforated film was tested according to Cling Method and it was found to be 9.8 gr. At the same time, a crack propagates from both sides of a hole along the TD requiring a force of 850 gr, according to Tear Test. The ultimate tensile properties of a CH specimen for said sample are 2.8 kg at 125% strain, possessing at the same time a force at 10% strain of 0.41 kg, according to Tensile Experiment.

Example 3

Perforated pre-stretched stretch film is provided wherein the perforations cover 29.8% of the total area and the weight of said film is 9.4 g/m$^2$ having a thickness of 9 µm. The cumulative same side cling of this perforated film was tested according to Cling Method and it was found to be 15.5 gr. At the same time, a crack propagates from both sides of a hole along the TD requiring a force of 740 gr, according to Tear Test. The ultimate tensile properties of a CH specimen for said sample are 1.4 kg at 110% strain, possessing at the same time a force at 10% strain of 0.42 kg, according to Tensile Experiment.

The following comparative examples present prominent characteristics of selected prior art perforated films.

Comparative Example 1

Sample A is a perforated pre-stretched stretch film of the prior art. The perforations cover 43.0% of the total film area and its weight is 7.6 g/m² maintaining a thickness of 9 μm. The cumulative same side cling of this perforated film was tested according to Cling Method and it was found to be 3.9 gr. At the same time, a crack propagates from both sides of a hole along the TD requiring a force of 1530 gr, according to Tear Test. The ultimate tensile properties of a CH specimen for said sample are 4.2 kg at 83% strain, possessing at the same time a force at 10% strain of 1.19 kg, according to Tensile Experiment.

Comparative Example 2

Sample B is a perforated stretch film of the prior art. The perforations cover 6.7% of the total film area and its weight is 19.9 g/m² having a thickness of 23 μm. The cumulative same side cling of this perforated film was tested according to Cling Method and it was found to be 25.2 gr. A crack propagates from both sides of a hole along the TD requiring a force of 1224 gr, according to Tear Test. The ultimate tensile properties of a CH specimen for said sample are 1.5 kg at 165% strain, possessing at the same time a force at 10% strain of 1.21 kg, according to Tensile Experiment.

Comparative Example 3

Further tests were performed on perforated stretch films of the invention and the prior art. The weight percentage of total surface area of film covered by holes, same side cling and elongation at break were measured, and the results are summarised in Table 1.

The first three films in the table are those of the invention, and the remainder are those of the prior art.

TABLE 1

| Film | Company | Weight (g/m²) | Sholes/Sfilm (%) | c.peel-off (gr) | Elongation at Break (%) |
|---|---|---|---|---|---|
| AOF Experimental No. 1 | Megaplast | 8.6 | 36.7 | 9.8 | 125 |
| AOF Experimental No. 2 | Megaplast | 9.8 | 36.7 | 6.1 | 145 |
| FL Experimental No. 3 | Megaplast | 7.5 | 28.8 | 17.8 | 79 |
| STANDARD | Megaplast | 7.6 | 43.0 | 3.9 | 83 |
| PERFOSTRETCH 13MY | Technotape | 12.0 | 7.1 | 10.7 | 37 |
| PERFOSTRETCH 23MY | Technotape | 19.9 | 6.7 | 25.2 | 165 |
| CLIMAWRAP | ITW/Oripack | 11.2 | 11.1 | 25.0 | 56 |
| Gen-Air | Genplast | 9.1 | 11.2 | 38.0 | 59 |

The invention claimed is:

1. A polyolefin pre-stretched packaging film comprising perforations arranged in a series of columns along a longitudinal direction of the film, wherein each adjacent column of said perforations is separated by a column without perforations along the longitudinal direction, and the perforations are staggered in a transverse direction across the film,
   wherein there is an area of film at least 1.5 mm long between each perforation in the longitudinal direction;
   wherein the force required to elongate up to 10% strain of two adjacent columns without holes of the film is more than 0.10 kg and less than 1.10 kg;
   wherein said film comprises an inherent cling surface on at least one of its surfaces;
   wherein the perforations cover at least 25% of the total surface area of the film, and the film has an inside/inside cling property of 5 to 22 gr, and a weight of no more than 13 g/m²;
   wherein the film comprises polyethylene.

2. The polyolefin pre-stretched packaging film according to claim 1, wherein the perforations cover 25-50% of the total surface area of the film.

3. The polyolefin pre-stretched packaging film according to claim 1, wherein the film has a thickness of less than 12 μm.

4. The polyolefin pre-stretched packaging film according to claim 1, wherein the film has a weight of less than 11 g/m².

5. The polyolefin pre-stretched packaging film according to claim 1, wherein the film has an inside/inside cling property of 6-19 gr.

6. The polyolefin pre-stretched packaging film according to claim 1, wherein the film has a necked-in width of 35-54 cm.

7. The polyolefin pre-stretched packaging film according to claim 1, wherein a crack propagates along the transverse direction from both sides of a hole of the film by applying a force along the machine direction of preferably less than 1500 gr.

8. The polyolefin pre-stretched packaging film according to claim 1, wherein the force required to break two adjacent columns without holes of the film is more than 1 kg and less than 4 kg.

9. The polyolefin pre-stretched packaging film according to claim 1, wherein two adjacent columns without holes of the film have an elongation at break of more than 50% and less than 150%.

10. The polyolefin pre-stretched packaging film according to claim 1, wherein the perforations are surrounded by a lip of similar thickness to the film.

11. The polyolefin pre-stretched packaging film according to claim 1, wherein the film is an asymmetrical A/B/C film, wherein A is a slip layer, B is a core layer and C is a cling layer.

12. The polyolefin pre-stretched packaging film according to claim 11, wherein the cling layer comprises 40 to 100% by weight of very low density polyethylene (VLDPE).

13. The polyolefin pre-stretched packaging film according to claim 12, wherein the cling layer further comprises up to 60% by weight ultra low density polyethylene (ULDPE).

14. The polyolefin pre-stretched packaging film according to claim 1, wherein the film does not comprise reinforcing elements.

15. The polyolefin pre-stretched packaging film according to claim 1, wherein the filing is used to wrap goods in separate packets or to unitize goods on a pallet.

16. The polyolefin pre-stretched packing film according to claim 15, wherein the film does not require knots for fixing upon product unitization.

17. The polyolefin pre-stretched packaging film according to claim 1, wherein the film at the lateral columns without holes may have a width of more than one times the width of an adjacent column without holes.

18. The polyolefin pre-stretched packaging film according to claim 1, wherein the film allows an initiation and a controllable propagation of a user's hand-induced tearing of the film in a transverse direction.

* * * * *